United States Patent [19]
Lundy et al.

[11] Patent Number: 5,187,211
[45] Date of Patent: Feb. 16, 1993

[54] GAMMA RADIATION RESISTANT POLYCARBONATE COMPOSITIONS

[75] Inventors: Charles E. Lundy; Sivaram Krishnan, both of Pittsburgh; Gerald L. Robbins, Wexford; Rick L. Archey, Pleasant Hills, all of Pa.

[73] Assignee: Miles Inc., Pittsburgh, Pa.

[21] Appl. No.: 305,301

[22] Filed: Feb. 1, 1989

Related U.S. Application Data

[63] Continuation-in-part of Ser. No. 67,670, Jun. 26, 1987, abandoned.

[51] Int. Cl.$^5$ ............................ C08K 5/15; C08K 5/06
[52] U.S. Cl. .................................. 524/107; 524/109; 524/111; 524/369; 524/376; 524/377; 524/378
[58] Field of Search ............... 522/21, 163; 524/107, 524/109, 111, 369, 376, 377, 378

[56] References Cited

U.S. PATENT DOCUMENTS

| | | | |
|---|---|---|---|
| 3,385,814 | 5/1968 | von Falkai et al. | 524/378 |
| 3,385,815 | 5/1968 | Yoshitake et al. | 524/378 |
| 4,451,641 | 5/1986 | Sublett et al. | 528/295 |
| 4,460,445 | 7/1986 | Rekers | 204/159.2 |
| 4,624,972 | 11/1986 | Nace | 523/136 |
| 4,904,710 | 2/1990 | Nace | 523/137 |

FOREIGN PATENT DOCUMENTS

| | | |
|---|---|---|
| 0512012 | 1/1985 | European Pat. Off. |
| 152012 | 8/1985 | European Pat. Off. |
| 0228525 | 10/1986 | European Pat. Off. |

*Primary Examiner*—Kriellion S. Morgan
*Attorney, Agent, or Firm*—Joseph C. Gil; Aron Preis

[57] ABSTRACT

The invention relates to thermoplastic polycarbonate molding compositions which are rendered resistant to gamma-radiation by incorporating therewith about 0.1 to about 5 percent by weight of a stabilizing agent selected from the group consisting of

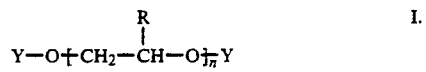

I.

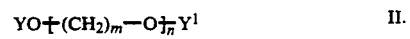

II.

wherein R is a hydrogen or a halogen atom or a $C_1$-$C_{10}$ alkyl, a $C_6$-$C_{10}$ alkyl, a $C_6$-$C_{10}$ aryl, $C_1$-$C_{22}$ acyl, $C_6$-$C_{18}$ alkylaryl or a $C_4$-$C_{10}$ cycloalkyl radical, n is an integer of at least 1 and preferably 1 to about 100 and Y and $Y^1$ independently are a hydrogen atom, a $C_6$-$C_{10}$ aryl, $C_1$-$C_{10}$ alkyl or a $C_6$-$C_{18}$ alkylaryl or a $C_6$-$C_{18}$ arylalkyl radical or

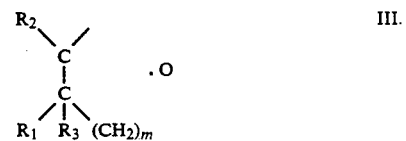

III.

or

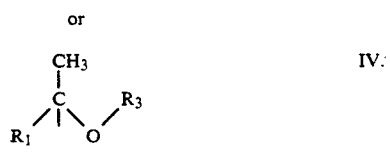

IV.

or

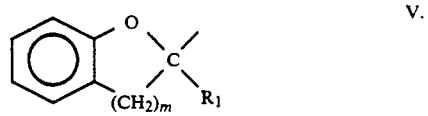

V.

or

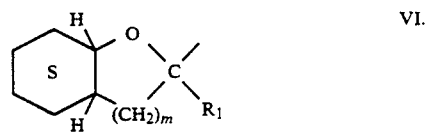

VI.

wherein m is 1 or 3-6, $R_1$, $R_2$ and $R_3$ independently are a hydrogen atom or a $C_1$-$C_{10}$ alkyl, $C_6$-$C_{10}$ aryl or a $C_6$-$C_{18}$ alkylaryl radical.

6 Claims, No Drawings

GAMMA RADIATION RESISTANT POLYCARBONATE COMPOSITIONS

CROSS REFERENCE TO RELATED APPLICATION

This application is a continuation-in-part of U.S. application Ser. No. 07/067,670, filed Jun. 26, 1987 now abandoned.

FIELD OF THE INVENTION

The invention is directed to polycarbonate molding compositions and more particularly, to thermoplastic compositions resistant to gamma radiation.

SUMMARY OF THE INVENTION

The invention relates to thermoplastic polycarbonate molding compositions which are rendered resistant to gamma-radiation by incorporating therewith about 0.1 to about 5% by weight of a stabilizing agent selected from the group consisting of

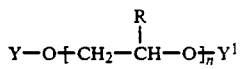   I.

or

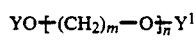   II.

wherein R is a hydrogen or a halogen atom or a $C_1$–$C_{10}$ alkyl, $C_6$–$C_{10}$ aryl, $C_6$–$C_{18}$ arylalkyl or a $C_4$–$C_{10}$ cycloalkyl radical, n is an integer of at least 1 and Y and $Y^1$ independently are a hydrogen atom, an $C_6$–$C_{10}$ aryl, $C_1$–$C_{10}$ alkyl or a $C_6$–$C_{18}$ aralkyl radical or

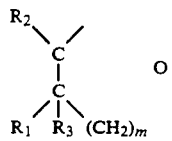   III.

or

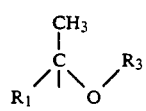   IV.

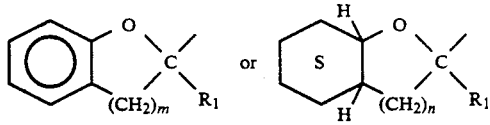   V.

wherein m is 1 or 3–6, $R_1$, $R_2$ and $R_3$ independently are hydrogen atoms or a $C_1$–$C_{10}$ alkyl, $C_6$–$C_{10}$ aryl or a $C_6$–$C_{18}$ arylalkyl radical.

BACKGROUND OF THE INVENTION

Because of its physical and mechanical properties polycarbonate resin was found to be eminently suitable for a variety of applications in the medical field. Applications which require sterilization by exposure to gamma radiation present a problem since polycarbonate tends to yellow and show increased haze. The art is noted to include U.S. Pat. No. 4,624,972 which disclosed polycarbonate compositions resistant to gamma radiation containing an ester of an aromatic polycarboxylic acid. European Patent Application 152,012 disclosed a method for increasing the ionizing radiation resistance of polycarbonate by including in the composition a non-polymeric compound which is characterized by a strong oxidizing action and/or reaction at high reaction rate with active species such as E or OH radicals or hydrated electrons formed by ionizing radiation. U.S. Pat. No. 4,451,641 disclosed a container prepared from a copolyester which has been modified with either a dimer acid or a dimer glycol. The copolyester is said to have an improved resistance to gamma radiation. Radiation stable polyolefin compositions have been disclosed in U.S. Pat. No. 4,460,445.

DETAILED DESCRIPTION OF THE INVENTION

The composition of the invention comprises a polycarbonate resin and a stabilizing agent in an amount sufficient to enhance the resistance of the resin to yellowness and to the formation of haze upon exposure to gamma radiation. Preferably, the composition contains about .1 to 5.0, preferably .1 to 3.0 percent of the stabilizing agent.

The polycarbonate resins useful in the practice of the invention are homopolycarbonates, copolycarbonates and terpolycarbonates or mixtures thereof. The polycarbonates generally have a weight average molecular weight of 10,000–200,000, preferably about 20,000–80,000 and their melt flow rate, per ASTM D-1238 at 300° C., is about 1 to about 65 gm/10 min., preferably about 2–15 gm/10 min. They may be prepared, for example, by the known diphasic interface process from a carbonic acid derivative such as phosgene and dihydroxy compounds by polycondensation (see German Offenlegungsschriften 2,063,050; 2,063,052; 1,570,703; 2,211,956; 2,211,957 and 2,248,817; French Patent 1,561,518; and the monograph H. Schnell, "Chemistry and Physics of Polycarbonates", Interscience Publishers, New York, 1964, all incorporated herein by reference).

In the present context, dihydroxy compounds suitable for the preparation of the polycarbonates of the invention conform to the structural formulae (1) or (2)

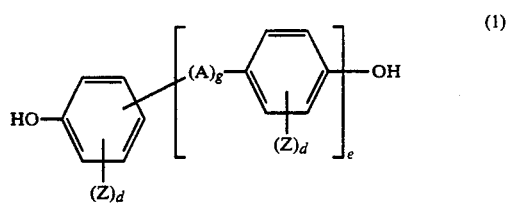   (1)

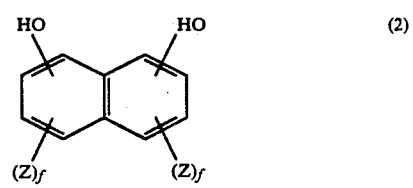   (2)

wherein

A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atoms, a sulfur atom, —SO— or —SO$_2$— or a radical conforming to

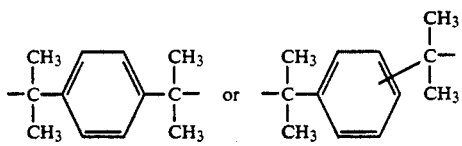

e and g both denote the number 0 to 1;
Z denotes F, Cl, Br or C$_1$-C$_4$-alkyl and if several Z radicals are substituents in one aryl radical, they may be identical or different one from the other;
d denotes an integer of from 0 to 4; and
f denotes an integer of from 0 to 3.

Among the dihydroxy compounds useful in the practice of the invention are hydroquinone, resorcinol, bis-(hydroxyphenyl) alkanes, bis-(hydroxyphenyl) ethers, bis-(hydroxyphenyl)-ketones, bis-(hydroxyphenyl)-sulfoxides, bis-(hydroxyphenyl)-sulfides, bis-(hydroxyphenyl)-sulfones, and α,α'-bis-(hydroxyphenyl)-diisopropyl-benzenes, as well as their nuclear-alkylated compounds. These and further suitable aromatic dihydroxy compounds are described, for example in U.S. Pat. Nos. 3,028,356; 2,999,835; 3,148,172; 2,991,273; 3,271,367; and 2,999,846, all incorporated herein by reference. Further examples of suitable bisphenols are 2,2-bis-(4-hydroxyphenyl)-propane (bisphenol A), 2,4-bis-(4-hydroxyphenyl)-2-methyl-butane, 1,1-bis-(4-hydroxyphenyl)-cyclohexane, α,α'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)-sulfone, hydroxybenzophenone, 2,4-bis-(3,5-dimethyl-4-hydroxyphenyl)-cyclohexane, α,α'-bis-(3,5-dimethyl-4-hydroxyphenyl)-p-diisopropylbenzene and 4,4'-sulfonyl diphenyl.

Examples of particularly preferred aromatic bisphenols are 2,2-bis-(4-hydroxyphenyl)-propane, 2,2-bis-(3,5-dimethyl-4-hydroxyphenyl)-propane and 1,1-bis-(4-hydroxyphenyl)-cyclohexane.

The most preferred bisphenol is 2,2-bis-(4-hydroxyphenyl)-propane (bisphenol A).

The polycarbonates of the invention may entail in their structure units derived from one or more of the suitable bisphenols.

Among the resins suitable in the practice of the invention are included phenolphthalein-based polycarbonate, copolycarbonates and terpolycarbonates such as are described in U.S. Pat. Nos. 3,036,036 and 4,210,741, both incorporated by reference herein.

The polycarbonates of the invention may also be branched by condensing therein small quantities, e.g., 0.05-2.0 mol % (relative to the bisphenols) of polyhydroxyl compound. Polycarbonates of this type have been described, for example, in German Offenlegungsschriften 1,570,533; 2,116,974 and 2,113,374; British Patents 885,442 and 1,079,821 and U.S. Pat. No. 3,544,514. The following are some examples of polyhydroxyl compounds which may be used for this purpose: phloroglucinol; 4,6-dimethyl2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis-[4,4-(4,4'-dihydroxydiphenyl)-cyclohexyl]-propane; 2,4-bis-(4-hydroxy-1-isopropylidine)-phenol; 2,6-bis-(2'-dihydroxy-5'-methylbenzyl)-4-methylphenol; 2,4-dihydroxy-benzoic acid; 2-(4-hydroxyphenyl)-2-(2,4-dihydroxyphenyl)-propane and 1,4-bis-(4,4'-dihydroxytriphenylmethyl)-benzene. Some of the other polyfunctional compounds are 2,4-dihydroxybenzoic acid, trimesic acid, cyanuric chloride and 3,3-bis-(4-hydroxyphenyl)-2-oxo-2,3-dihydroindole.

In addition to the polycondensation process mentioned above, other processes for the preparation of the polycarbonates of the invention are polycondensation in a homogeneous phase and transesterification. The suitable processes are disclosed in the incorporated herein by references U.S. Pat. Nos. 3,028,365; 2,999,846; 3,153,008; and 2,991,273.

The preferred process for the preparation of polycarbonates is the interfacial polycondensation process.

Other methods of synthesis in forming the polycarbonates of the invention such as disclosed in U.S. Pat. No. 3,912,688, incorporated herein by reference, may be used.

Suitable polycarbonate resins are available in commerce, for instance, under the tradenames Makrolon FCR, Makrolon 2600, Makrolon 2800 and Makrolon 3100, all of which are bisphenol A based homopolycarbonate resins differing in terms of their respective molecular weights and characterized in that their melt flow indices (MFR) per ASTM D-1238 are about 16.5-24, 13-16, 7.5-13.0 and 3.5-6.5 gm/10 min., respectively. These are products of Mobay Corporation of Pittsburgh, Pa.

The stabilization agent in accordance with the present invention is a monomeric or a polymeric compound conforming structurally to

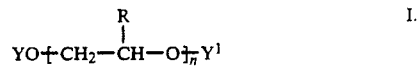

or to

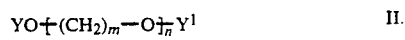

wherein R is a hydrogen or a halogen atom or a C$_1$-C$_{10}$ alkyl, a C$_6$-C$_{10}$ aryl, C$_6$-C$_{18}$ alkylaryl or a C$_4$-C$_{10}$ cycloalkyl radical, n is an integer of at least 1 and preferably 1 to about 100 and Y and Y$^1$ independently are a hydrogen atom, a C$_6$-C$_{10}$ aryl, C$_1$-C$_{10}$ alkyl or a C$_6$-C$_{18}$ alkylaryl or a C$_6$-C$_{18}$ arylalkyl radical or

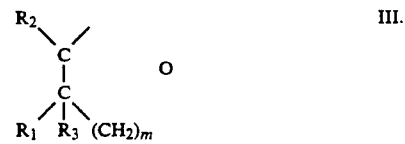

or

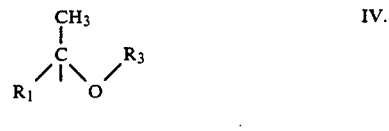

or

-continued

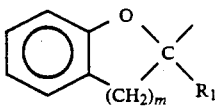 V.

or

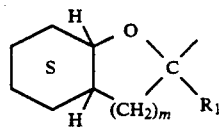 VI.

wherein m is 1 or 3–6 and $R_1$, $R_2$ and $R_3$ independently are a hydrogen atom or a $C_1$–$C_{10}$ alkyl, $C_6$–$C_{10}$ aryl or a $C_6$–$C_{18}$ alkylaryl radical.

A preferred stabilizing agent conforms to

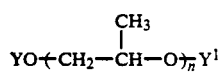 Ia.

wherein n is about 10 to about 60 and wherein Y and $Y^1$ are identical and denote a hydrogen atom or an end-blocking group conforming to formula III or IV.

The stabilizing agents of the invention conforming to the embodiments where Y and $Y^1$ are hydrogen atoms are commercially available compounds, for instance, under the tradename Multranol from Mobay Corporation. The preparation of the preferred, end-blocked embodiment is demonstrated below. Among the more preferred embodiments of the stabilizing agent are the compounds of formula Ia wherein Y and $Y^1$ denote end blocking groups derived from ethyl vinyl ether, or dihydropyran.

The preferred end blocked stabilizer of the invention offers certain advantages over its unblocked counterpart— the embodiment where Y's are hydrogen atoms— since it is inert. A comparison of the optical properties of polycarbonate compositions containing these stabilizers shows that the end-blocked embodiment is more effective than its counterpart at high molding temperatures. The table below summarizes the comparison between compositions each containing 1% of a stabilizer. In Composition 1 the stabilizer conforms structurally to:

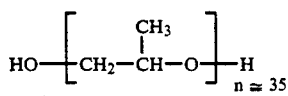 VII.

and in Composition 2 the stabilizer was

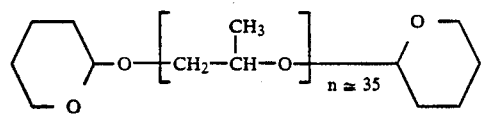 VIII.

The polycarbonate resin was Makrolon M-40 (MFR 6-11.9 gm/10 min)

|  | Melt Temperature | |
|---|---|---|
|  | 550° F. | 650° F. |
| Composition 1 | | |
| Yellowness Index | 3.13 | 2.27 |
| Haze, % | 2.64 | 1.14 |
| Total light transmission | 81.83 | 88.59 |
| Composition 2 | | |
| Yellowness Index | 2.71 | 2.47 |
| Haze, % | 0.66 | 0.73 |
| Total light transmission | 88.92 | 88.98 |

An additional comparison including the corresponding values for the unstabilized polycarbonate resins is shown below.

| Composition | Melt Temperature | |
|---|---|---|
|  | 550° F. | 650° F. |
| Makrolon 2800 | | |
| Yellowness Index | 3.98 | 4.63 |
| Haze, % | 0.99 | 1.35 |
| Total Light Transmission, % | 88.0 | 87.6 |
| Composition 1 | | |
| Yellowness Index | 2.76 | 2.99 |
| Haze, % | 0.69 | 0.97 |
| Total Light Transmission, % | 88.8 | 88.7 |
| Composition 2 | | |
| Yellowness Index | 2.74 | 3.00 |
| Haze, % | 0.67 | 1.07 |
| Total Light Transmission, % | 88.5 | 88.6 |

The preparation of the preferred dihydropyran end-capped stabilizer is shown schematically as

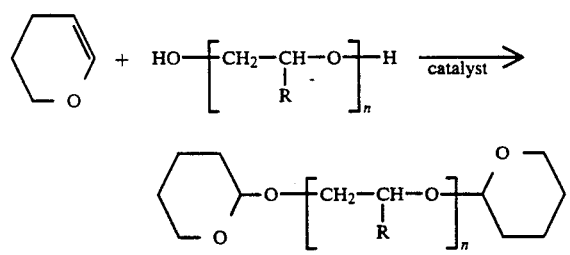

where R is as defined for Formula I and II above and where the catalyst is a Lewis acid such as toluene sulfonic acid, HCl or a benzene sulfonic acid.

The invention is further illustrated but is not intended to be limited by the following examples in which all parts and percentages are by weight unless otherwise specified.

EXAMPLES

EXAMPLE 1

Preparation of a DHP end-blocked Stabilizer

A polyether conforming structurally to Formula VII above (300 grams) was dissolved in 400 ml of tetrahydrofuran in a 100 ml three-necked flask. 0.25 grams of p-toluene sulfonic acid-a catalyst-was then added and the mixture stirred. After complete dissolution there was slowly added dihydropyran (26.4 g). A 5 degree exotherm occurred, raising the final temperature to about 60° C. The temperature was then raised to reflux for 8 additional hours. Afterward an appropriate amount of triethylamine was added to the solution to remove excess acid. The solution was then filtered and vacuum distilled to remove any unreacted dihydropyran and tetrahydrofuran from the product.

EXAMPLE 2

Compositions of the invention containing the end-blocked stabilizers prepared in accordance with Example 1 above were evaluated as to their optical properties both before and after exposure to gamma radiation. The Tables below summarize the results of the evaluation and includes a comparison between compositions containing no stabilizer and composition containing 0.5% and 1% of the stabilizer. In Table 1 the polycarbonate resin was Makrolon FCR and in Table 2 the resin was Makrolon 2800 which is a bisphenol-A based homopolymer having a melt flow index of about 6–11.9 gm/10 min.

with the polycarbonate. Other conventional additives may also be incorporated in the composition for their art-recognized utility. These include release agents, plasticizers, stabilizers, antioxidants, fillers, reinforcements and the like.

The thermoplastic molding composition of the invention is characterized in that the polycarbonate resin component is substantially amorphous and in that in the absence of pigments or dyes, it has a light transmission greater than 75% and in that it is virtually free from haze.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polycarbonate molding composition comprising

TABLE I

| Composition | Melt Temp. | Radiation Dose (Mega Rads) | % Light[2] Transmission | Haze %[4] | YI[2] | ΔYI[3] |
|---|---|---|---|---|---|---|
| Makrolon FCR[1] | 550° | 0.0 | 87.26 | 2.31 | 40.07 | — |
| | | 2.5 | 85.26 | 2.54 | 12.10 | 8.03 |
| | | 5.0 | 84.09 | 2.17 | 16.89 | 12.82 |
| | 650° | 0.0 | 86.87 | 2.56 | 4.17 | — |
| | | 2.5 | 85.28 | 2.63 | 10.35 | 6.18 |
| | | 5.0 | 84.65 | 2.32 | 13.98 | 9.81 |
| 0.5% Additive of DHP end blocked stabilizer in Makrolon FCR | 550° | 0.0 | 88.48 | 1.23 | 3.09 | — |
| | | 2.5 | 87.37 | 1.45 | 8.17 | 5.07 |
| | | 5.0 | 86.90 | 1.10 | 11.05 | 7.96 |
| | 650° | 0.0 | 88.53 | 1.15 | 3.34 | — |
| | | 2.5 | 87.52 | 1.10 | 7.68 | 4.34 |
| | | 5.0 | 87.04 | 1.10 | 10.84 | 7.50 |
| 0.5% Additive of DHP end blocked stabilizer in Makrolon FCR | 700° | 0.0 | 87.98 | 1.74 | 4.12 | — |
| | | 2.5 | 86.27 | 2.59 | 8.37 | 4.24 |
| | | 5.0 | 86.69 | 1.88 | 10.53 | 6.41 |
| 1.0% Additive of DHP end blocked stabilizer in Makrolon FCR | 500° | 0.0 | 88.63 | 0.95 | 2.32 | — |
| | | 2.5 | 87.54 | 1.67 | 7.30 | 4.98 |
| | | 5.0 | 87.35 | 1.48 | 10.16 | 7.84 |
| | 650° | 0.0 | 88.58 | 1.10 | 3.46 | — |
| | | 2.5 | 87.57 | 1.54 | 6.64 | 3.19 |
| | | 5.0 | 87.50 | 1.54 | 8.69 | 5.23 |
| | 700° | 0.0 | 84.51 | 5.04 | 4.59 | — |
| | | 2.5 | 83.57 | 5.52 | 7.28 | 2.69 |
| | | 5.0 | 79.14 | 10.44 | 9.76 | 5.17 |

[1]Makrolon FCR, a homopolycarbonate based on bisphenol A characterized in that its melt flow index is about 16.5-24 gm/10 min.
[2]Per ASTM D-1925
[3]Difference in yellowness index in comparison with the unradiated sample
[4]Per ASTM D-1003

TABLE II

| Composition | Melt Temp. (°F.) | Radiation Dose (Mega Rads) | % Light Transmission | Haze % | YI | ΔYI |
|---|---|---|---|---|---|---|
| Makrolon 2800 | 550 | 0.0 | 88.0 | 0.99 | 3.98 | — |
| | | 2.5 | 86.4 | 1.67 | 7.86 | 3.88 |
| | | 5.0 | 85.3 | 1.50 | 12.30 | 8.32 |
| | 650 | 0.0 | 87.6 | 1.35 | 4.63 | — |
| | | 2.5 | 86.5 | 1.06 | 6.90 | 2.27 |
| | | 5.0 | 85.5 | 0.93 | 12.00 | 7.37 |
| Makrolon 2800 containing 0.5% of DHP end blocked stabilizer | 550 | 0.0 | 87.8 | 1.51 | 2.99 | — |
| | | 2.5 | 87.1 | 1.52 | 5.99 | 3.00 |
| | | 5.0 | 86.7 | 1.31 | 8.59 | 5.60 |
| | 650 | 0.0 | 88.7 | 1.07 | 3.06 | — |
| | | 2.5 | 87.2 | 0.98 | 5.43 | 2.37 |
| | | 5.0 | 86.6 | 1.37 | 8.20 | 5.14 |
| Makrolon 2800 containing 1.0% of DHP end blocked stabilizer | 550 | 0.0 | 88.5 | 0.69 | 2.99 | — |
| | | 2.5 | 87.6 | 1.52 | 3.99 | 1.00 |
| | | 5.0 | 87.0 | 1.31 | 7.62 | 4.63 |
| | 650 | 0.0 | 88.6 | 1.07 | 3.00 | — |
| | | 2.5 | 87.8 | 0.68 | 5.30 | 2.30 |
| | | 5.0 | 87.1 | 0.68 | 6.98 | 3.98 |

The compositions of the invention may be prepared by following conventional procedures for the preparation of polycarbonate molding compositions. The stabilizing agent may be introduced by directly mixing it (i) a substantially amorphous aromatic polycarbonate resin and
(ii) a stabilizing agent selected from the group consisting of

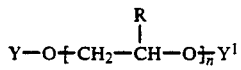   I.

and

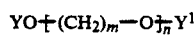   II.

wherein R is a hydrogen or a halogen atom or a $C_1$–$C_{10}$ alkyl, $C_6$–$C_{10}$ aryl, $C_6$–$C_{18}$ arylalkyl or a $C_4$–$C_{10}$ cycloalkyl radical, Y and $Y^1$ are independently a $C_6$–$C_{10}$ aryl or $C_6$–$C_{18}$ arylalkyl radical or

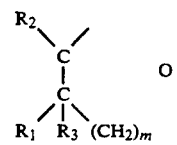   III.

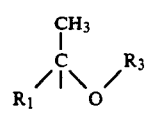   IV.

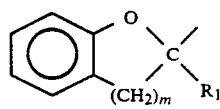   V.

or

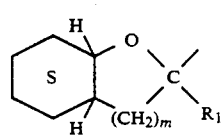   VI.

wherein m is 1 or 3–6, $R_1$, $R_2$ and $R_3$ independently are a hydrogen atom or a $C_1$–$C_{10}$ alkyl, $C_6$–$C_{10}$ aryl or a $C_6$–$C_{18}$ arylalkyl radical and n is about 1 to 100, said (ii) being present in an amount of about 0.1 to 5.0 percent relative to the weight of the composition.

2. The composition of claim 1 wherein said polycarbonate is a homopolymer based on bisphenol A.

3. A polycarbonate molding composition comprising
(i) an aromatic polycarbonate resin and
(ii) a stabilizing agent conforming to

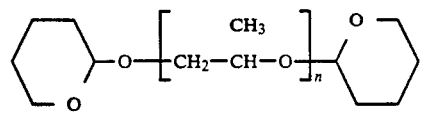

wherein n≈35, said stabilizing agent being present in sufficient amount to enhance the resistance of said resin to the deterioration of its optical properties upon exposure of gamma radiation.

4. A polycarbonate molding composition comprising
(i) an aromatic polycarbonate resin and
(ii) a stabilizing agent selected from the group consisting of

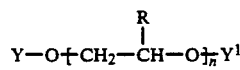   I.

and

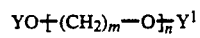   II.

wherein R is a hydrogen or a halogen atom or a $C_1$–$C_{10}$ alkyl, $C_6$–$C_{10}$ aryl, $C_6$–$C_{18}$ arylalkyl or a $C_4$–$C_{10}$ cycloalkyl radical, Y and $Y^1$ are independently a $C_6$–$C_{10}$ aryl or $C_6$–$C_{18}$ arylalkyl radical or

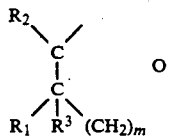   III.

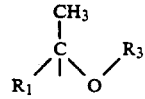   IV.

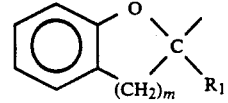   V.

or

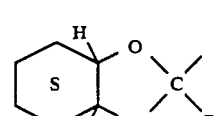   VI.

wherein m is 1 or 3–6, $R_1$, $R_2$ and $R_3$ independently are a hydrogen atom or a $C_1$–$C_{10}$ alkyl, $C_6$–$C_{10}$ aryl or a $C_6$–$C_{18}$ arylalkyl radical and n is about 1 to 100, said (ii) being present in an amount of 0.1 to 3 percent relative to the weight of said composition.

5. A thermoplastic molding composition comprising
(i) a substantially amorphous aromatic polycarbonate resin and
(ii) a stabilizing agent conforming to

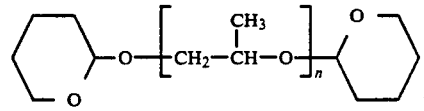

wherein n is about 35.

6. A thermoplastic molding composition consisting essentially of
(i) a substantially amorphous aromatic polycarbonate resin and
(ii) a stabilizing agent selected from the group consisting of

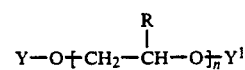   I.

and $$YO\underset{}{+}(CH_2)_m-O\underset{\overline{n}}{+}Y^1 \qquad \text{II.}$$

wherein R is a hydrogen or a halogen atom or a $C_1$–$C_{10}$ alkyl, $C_6$–$C_{10}$ aryl, $C_6$–$C_{18}$ arylalkyl or a $C_4$–$C_{10}$ cycloalkyl radical, Y and $R^1$ are independently a $C_6$–$C_{10}$ aryl or $C_6$–$C_{18}$ arylalkyl radical or

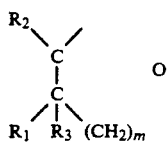   III.

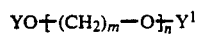   IV.

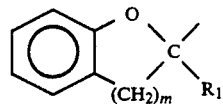   V.

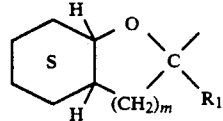   VI.

wherein m is 1 or 3–6, $R_1$, $R_2$ and $R_3$ independently are a hydrogen atom or a $C_1$–$C_{10}$ alkyl, $C_6$–$C_{10}$ aryl or a $C_6$–$C_{18}$ arylalkyl radical and n is about 1 to 100, said (ii) being present in an amount of about 0.1 to 5.0 percent relative to the weight of the composition.

* * * * *

UNITED STATES PATENT AND TRADEMARK OFFICE
CERTIFICATE OF CORRECTION

PATENT NO. : 5,187,211
DATED : February 16, 1993
INVENTOR(S) : Charles E. Lundy et al It is certified that error appears in the above-indentified patent and that said Letters Patent is hereby corrected as shown below:

In the Abstract, delete formula III and insert the following therefor:

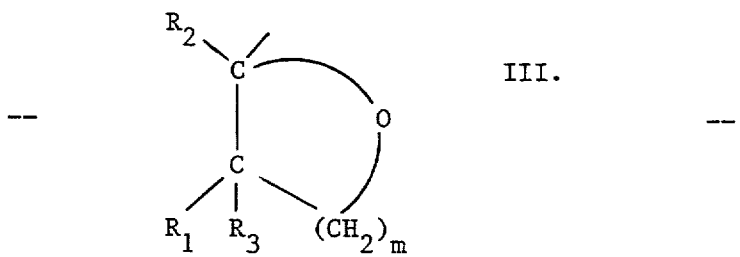

Also in the Abstract, following formula VI, delete "wherein m is 1 or 3-6," and insert --wherein m is 1 or 3-6 and-- therefor.

At column 1, line 40 and at column 4, line 55, delete formula III and insert the following therefor:

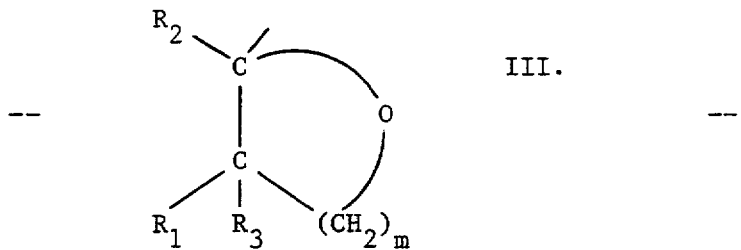

At column 2, line 28, delete "preferably about 20,000-80,000" and insert --preferably 20,000-80,000-- therefor.

UNITED STATES PATENT AND TRADEMARK OFFICE
CERTIFICATE OF CORRECTION

PATENT NO. : 5,187,211
DATED : February 16, 1993
INVENTOR(S) : Charles E. Lundy et al It is certified that error appears in the above-indentified patent and that said Letters Patent is hereby corrected as shown below:

IN THE CLAIMS:

In Claim 1, at column 9, line 20; in Claim 4, at column 10, line 20;

and in Claim 6, at column 11, line 20, delete formula III, and insert the following therefor:

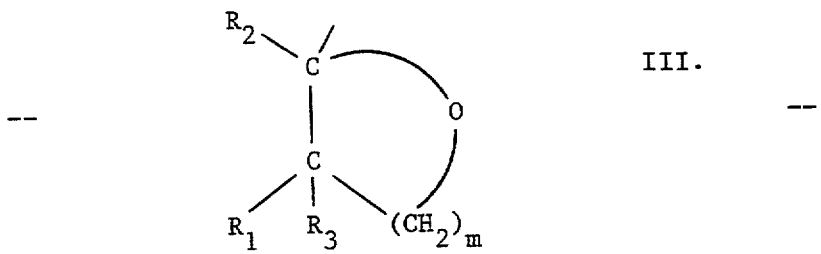

In Claim 6, at column 11, line 11, delete "Y and $R^1$" and insert
--Y and $Y^1$---therefor.

Signed and Sealed this

Sixteenth Day of August, 1994

Attest:

BRUCE LEHMAN

Attesting Officer     Commissioner of Patents and Trademarks